June 11, 1929.  F. IZZO  1,717,218
BRAKE BEAM SAFETY IRON
Filed June 4, 1926  3 Sheets-Sheet 1
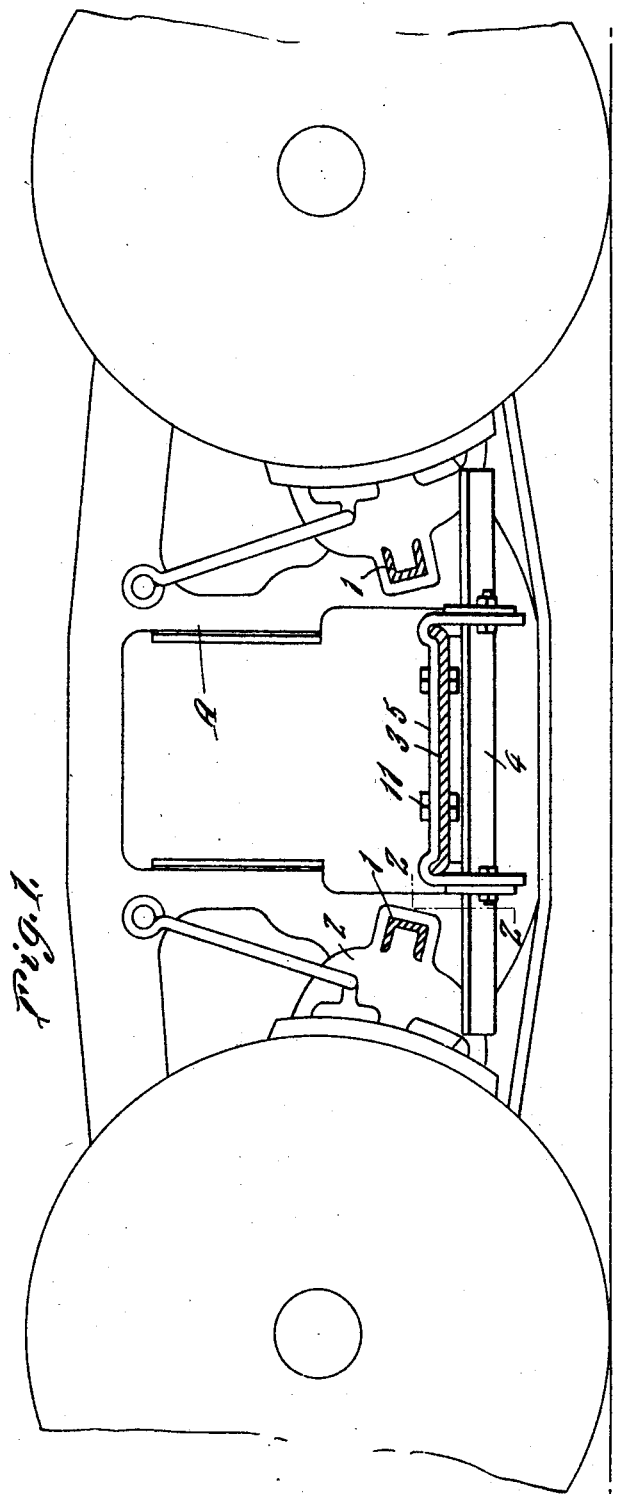
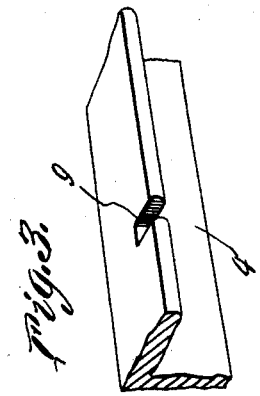
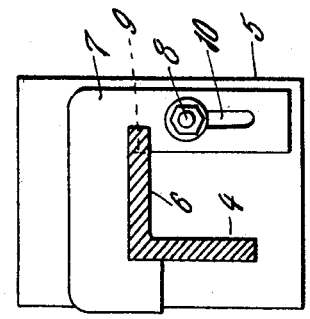
Frank Izzo ~
INVENTOR
BY Victor J. Evans
ATTORNEY

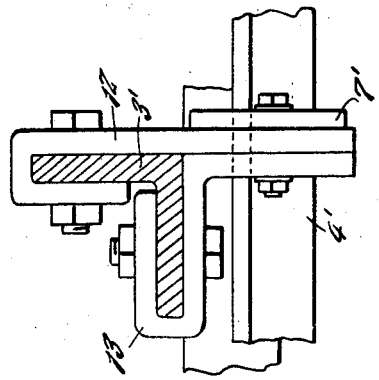
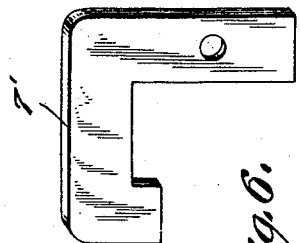
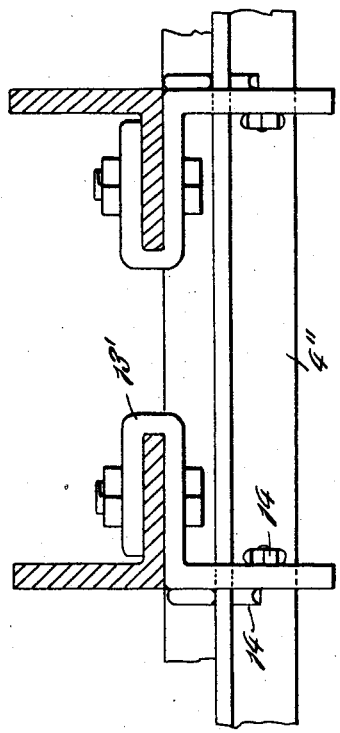
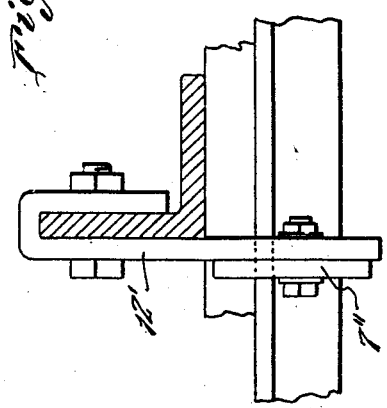

June 11, 1929.  F. IZZO  1,717,218
BRAKE BEAM SAFETY IRON
Filed June 4, 1926   3 Sheets-Sheet 3
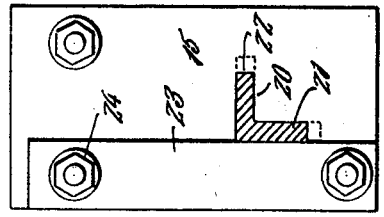
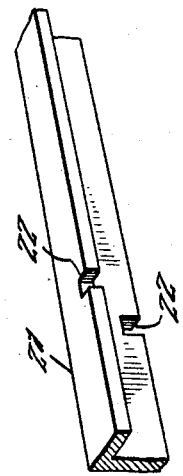
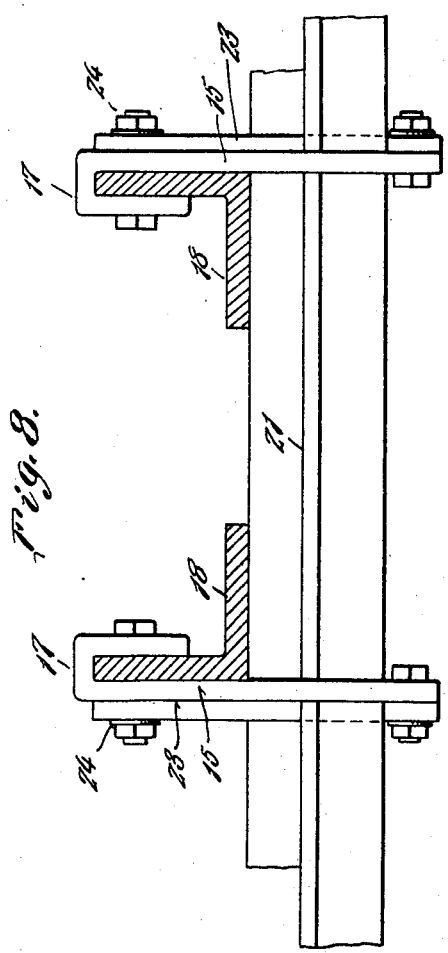
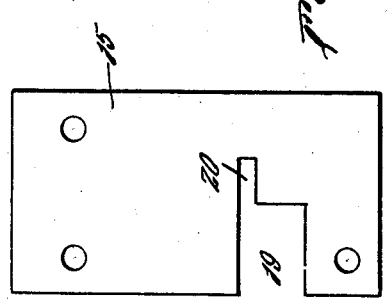

Patented June 11, 1929.

1,717,218

UNITED STATES PATENT OFFICE.

FRANK IZZO, OF HUNTINGTON, WEST VIRGINIA.

BRAKE-BEAM SAFETY IRON.

Application filed June 4, 1926. Serial No. 113,749.

This invention relates to improvements in brake beam safety devices, the general object of the invention being to provide means for supporting the safety bar from the truck frame so that said bar can be easily and quickly adjusted, as required.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of a portion of a truck frame, showing the invention in use.

Figure 2 is a section on line 2—2 of Figure 1.

Figure 3 is a fragmentary view of the safety bar.

Figure 4 is a view of a modification.

Figure 5 is a view of another modification.

Figure 6 is a view of the hook used with Figure 4.

Figure 7 is a view of a further modification.

Figures 8, 9, 10 and 11 are views of another modification.

In these drawings, the brake beams are shown at 1, the shoes at 2 and the spring plank at 3, this plank extending transversely across the center of the truck, the frame of which is shown at A.

The safety bar for the beams 1 is shown at 4, and in carrying out my invention, I place a pair of substantially U-shaped members 5 on the plank 3, each member having its limbs depending downwardly from the edge of the plank and each limb is formed with an angle shaped opening 6 for receiving the bar 4, it being understood that each member 5 supports one of the bars 4, and these bars 4 are so positioned with respect to the brake beams 1 that they will catch and hold said beams if they should drop from their original supports. The bars 4 are simply shoved through the holes 6 in the depending limbs of the members 5 and then a hook-shaped member 7 is bolted by the bolt 8 to each limb, each member 7 engaging a notch 9 formed in the bar 4 and the hook part embraces the upper portion of the bar. The bolt 8 passes through an elongated slot 10 in the member 7 so that the member can be engaged and disengaged from the bar 6 without entirely removing it from the member 5. This member 5 is bolted or otherwise fastened to the beam or plank 3, as shown at 11.

Figure 4 shows another manner of supporting the safety bar from the plank. In this form, the plank is composed of a pair of angle bars 3', only one of which is shown in Figure 4, and two hook-shaped members 12 and 13 have their hook-shaped portions bolted to the flanges of the bar 3'. The member 12 is straight, while the member 13 is of angle shape, the depending portions of the members 12 and 13 having holes therein for receiving the bar and hook, such as shown at 7' in Figure 6, is bolted to the depending portions of the members 12 and 13 and engages the bar 4' to prevent endwise movement of the bar.

Figure 5 shows another form of the invention in which but a single hook 13' is fastened to each section of the spring plank. This hook is the same as that shown at 13 in Figure 4 and has a hole in its depending part for receiving the bar 4''. In this case, cotter pins 14 are passed through holes in the safety bar 4'' to prevent endwise movement of said safety bar.

Figure 7 shows a hook 12' which is the same as that shown at 12 in Figure 4, used alone on each section of the spring plank. In this case, a hook 7'' is used to prevent endwise movement of the safety bar.

In the modification shown in Figures 8, 9, 10 and 11, a plate 15 has its hook-shaped upper end 17 engaging each section 18 of the spring plank and the lower portion of each plate 15 is provided with a rectangular-shaped notch 19 which has a narrow extension 20 in its inner end. The safety bar 21 fits in this notch 19 with its vertical flange engaging the inner end of the notch and its horizontal flange extending into the extension 20 of the notch. Each flange of the safety bar is notched as at 22, and these notches engage the walls of the recess, as shown in Figure 9. A flat bar 23 is bolted to the plate 15 and covers the major portion of the notch 19 and acts to hold the safety bar in position. Bolts 24 fasten the hook portions of the plates 15 to the sections 18 of the spring plank and some of these bolts are used to bolt the upper ends of the bars 23 to the plates 15.

In this modification, the safety bars are placed in engagement with the supporting plates 15 from the sides so that it is not necessary to push the safety bars through holes in the supporting plates, as is necessary in the other forms of the invention. In this modification, the safety bars can be more easily put in place and they are held against movement longitudinally by the notches 22 engaging portions of the walls of the notch 19 and they are held against lateral movement by the bars 23.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a truck frame including a spring plank and transverse brake beams suspended from the frame, an inverted U-shaped member having its bight fastened to the plank and having its limbs depending on each side of the plank, said limbs having openings therein, a safety bar passing through the said openings, said bar having notches therein and hook-shaped members connected with the depending limbs and engaging the notches for holding the bar in position.

2. In combination with a truck frame including a spring plank and transverse brake beams suspended from the frame, hangers connected with the plank and having openings therein, a safety bar of angle shape in cross section passing through the said openings, said openings also being of angle shape to fit the bar, said bar having notches therein and hook-shaped members detachably connected with the hangers and engaging the notches and portions of the bar for holding the bar in the openings.

3. In combination with a truck frame including a spring plank and transverse brake beams suspended from the frame, an inverted U-shaped member having its bight resting upon the plank and its limbs depending on each side of the plank, bolts for fastening the bight to the plank, said limbs having openings therein, a safety bar passing through the openings and resting upon the lower walls of said openings and passing under the bolts for holding the bolts in place if the nuts should drop therefrom and means for holding the bar against longitudinal movement in the openings.

In testimony whereof I affix my signature.

FRANK IZZO.